: 3,380,803
Patented Apr. 30, 1968

3,380,803
PROCESS FOR MANUFACTURE OF ALKALI METAL AND ALKALINE EARTH METAL HEXAFLUOROPHOSPHATES
Albert W. Jache, North Haven, and Santad Kongpricha, Hamden, Conn., assignors to Olin Mathieson Chemical Corporation
No Drawing. Filed Feb. 3, 1966, Ser. No. 524,867
3 Claims. (Cl. 23—88)

This invention relates to an improved process for the manufacture of alkali metal and alkaline earth metal hexafluorophosphates.

Muetterties et al., J. Inorg. Nucl. Chem. 16, 58 (1960) formed hexafluorophosphates of potassium and cesium, to a degree not disclosed, by heating the metal fluorides with phosphorus trifluoride at about 130 to 150° C. Sodium fluoride did not react at 280° C. in 5 hours.

According to the process of this invention, an alkali metal or alkaline earth metal fluoride is heated with elemental phosphorus in an excess of anhydrous hydrogen fluoride at temperatures of about 180 to 220° C. under autogenous pressure suitably for from about 3 to 20 hours or more. The mixture is heated suitably in a confined reaction zone, for example, a Monel or nickel pressure vessel. Suitable proportions of the fluoride salt to elemental phosphorus are preferably 1:1 but satisfactory results are obtained using much lower ratios. This ratio may range from as low as 0.01:1 to 1.2:1. The ratio of hydrogen fluoride to phosphorus is suitably from about 5:1 to 50:1 but more or less is satisfactory.

At temperatures substantially below 180° C., the yields diminish and become unsatisfactory. At temperatures above about 220° C. yields again diminish. At the temperatures used in the process of this invention, a portion of the hydrogen fluoride is in the liquid phase forming a medium for reaction.

The elemental phosphorus is charged in the yellow or red form, more conveniently the latter. However, at the reaction temperatures, unreacted phosphorus is converted into the more stable yellow form.

Varying amounts of phosphorus trifluoride and hydrogen usually appear as a by-product. The gaseous by-products and excess HF are suitably distilled from the reaction mixture. If desired the phosphorus trifluoride is separated from the gaseous by-products by low temperature fractionation.

The crude hexafluorophosphate salt remains as a residue and is purified by any suitable means, for example, crystallization from water.

EXAMPLE I

A 300 ml. Monel-lined pressure vessel fitted with a pressure gauge was charged at atmospheric pressure with red phosphorus and the alkali metal or alkaline earth metal fluoride. The desired amount of hydrogen fluoride was introduced into the pressure vessel. It was closed and the mixture was heated with shaking to the desired temperature and for the desired period.

Following this procedure the vessel was charged with 16.1 g. (0.277 mole) of potassium fluoride, 8.63 g. (0.277 mole) of red phosphorus and 100 g. of HF. The mixture was heated at 205° C. for 3.5 hours and then cooled to room temperature. The gaseous products were discharged from the reactor and the solid residue was extracted with water and the potassium hexafluorophosphate was crystallized out. The salt was filtered and dried in a vacuum. It amounted to 16.5 g.

EXAMPLE II

The procedure of Example I was substantially repeated using 16.5 g. (0.284 mole) of potassium fluoride, 8.63 g. (0.277 mole) of red phosphorus and 140 g. of HF. The mixture was heated at 200° C. for 7 hours. A yield of 30.9 g. of potassium hexafluorophosphate was obtained.

EXAMPLE III

The procedure of Example I was repeated using 16.1 g. (0.277 mole) of potassium fluoride, 8.63 g. (0.277 mole) of red phosphorus and 50.4 g. of HF. The mixture was heated at 210° C. for 11 hours resulting in a yield of 41.3 g. or 81% of theory of potassium hexafluorophosphate.

EXAMPLE IV

The procedure of Example I was substantially repeated using 11.7 g. (0.277 mole) of sodium fluoride, 8.63 g. (0.277 mole) of red phosphorus and 38.8 g. of HF. The mixture was heated at 210° C. for 11 hours to produce a yield of 17.5 g. of sodium hexafluorophosphate.

EXAMPLE V

The procedure of Example I was substantially repeated using 7.25 g. (0.279 mole) of lithium fluoride, 8.63 g. (0.277 mole) of red phosphorus and 43.4 g. of HF. The mixture was heated at 210° C. for 11 hours resulting in 3.25 g. of lithium hexafluorophosphate.

EXAMPLE VI

The procedure of Example I was substantially repeated using 10.85 g. (0.14 mole) of calcium fluoride, 8.63 g. (0.277 mole) of red phosphorus and 66.3 g. of HF. The mixture was heated at 200° C. for 15 hours resulting in 0.945 g. of calcium hexafluorophosphate.

EXAMPLE VII

The procedure of Example I was substantially repeated using 24.4 g. (0.14 mole) of barium fluoride, 8.63 g. (0.277 mole) of red phosphorus and 59.9 g. of HF. The mixture was heated at 210° C. for 11 hours resulting in 19.2 g. of barium hexafluorophosphate.

EXAMPLE VIII

The procedure of Example I was substantially repeated using 1 g. (0.017 mole) of potassium fluoride, 8.63 g. (0.277 mole) of red phosphorus and 43 g. of HF. The mixture was heated at 210° C. for 6 hours. Volatile components were distilled from the reaction mixture, leaving the resulting potassium hexafluorophosphate as a residue.

What is claimed is:
1. Process for preparing hexafluorophosphates which comprises heating a mixture of a member of the group consisting of alkali metal fluorides and alkaline earth metal fluorides, elemental phosphorus and anhydrous hydrogen fluoride at 180 to 220° C. under autogenous pressure to form a reaction mixture containing a hexafluorophosphate of said metal and separating said hexafluorophosphate from said reaction mixture.
2. Process according to claim 1 in which the molar ratio of metal fluoride to phosphorus is from 0.01:1 to 1.2:1 and the molar ratio of hydrogen fluoride to phosphorus is from 5:1 to 50:1.
3. Process according to claim 1 in which the elemental phosphorus is red phosphorus.

References Cited

J. H. Simons books: "Fluorine Chemistry," vol. I (1950), pages 164–166; vol. II (1954), pages 18 and 19, Academic Press, Inc., New York, N.Y.

Stacey, Tatlow and Sharpe book: "Advances in Fluorine Chemistry," vol. 5 (1965), page 67. Butterworth & Co., Ltd., London, England.

MILTON WEISSMAN, Primary Examiner.

EDWARD STERN, Examiner.